US012798792B2

(12) United States Patent
Bhaskara et al.

(10) Patent No.: US 12,798,792 B2

(45) Date of Patent: Nov. 17, 2026

(54) UNMANNED AERIAL VEHICLE (UAV) PROPELLED AUTONOMOUS MULTIPLANE CLEANING SYSTEM (UPAMCS)

(71) Applicant: Tata Consultancy Services Limited, Mumbai (IN)

(72) Inventors: Mohan Bhaskara, Bangalore (IN); Mahesha Gunmi, Bangalore (IN); Ranjan Dasgupta, Kolkata (IN); Babu Unnikrishnan, Chennai (IN); Kavita Sara Mathew, Chennai (IN); Arindam Saha, Kolkata (IN); Lokesh Kumar, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 392 days.

(21) Appl. No.: 18/604,817

(22) Filed: Mar. 14, 2024

(65) Prior Publication Data

US 2024/0317425 A1 Sep. 26, 2024

(30) Foreign Application Priority Data

Mar. 21, 2023 (IN) ............................ 202321019005

(51) Int. Cl.
*B64F 5/30* (2017.01)
*F16H 1/46* (2006.01)

(52) U.S. Cl.
CPC *B64F 5/30* (2017.01); *F16H 1/46* (2013.01)

(58) Field of Classification Search
CPC .. A47L 12/02; A47L 1/02; F24S 40/20; H02S 40/10; H02S 40/12; B64F 5/30; B64F 5/3902; B64F 3/02
See application file for complete search history.

(56) References Cited

U.S. PATENT DOCUMENTS

2017/0210470 A1 7/2017 Pardell
2018/0208307 A1 7/2018 Boehme

FOREIGN PATENT DOCUMENTS

| | | | | |
|---|---|---|---|---|
| CN | 115213146 A | * 10/2022 | ............ | H02S 40/10 |
| KR | 10-1579036 | 12/2015 | | |
| KR | 20230000518 A | * 1/2023 | ............... | B64D 1/18 |

* cited by examiner

*Primary Examiner* — Shay Karls

(74) *Attorney, Agent, or Firm* — Finnegan, Henderson, Farabow, Garrett & Dunner, LLP

(57) ABSTRACT

Cleaning systems proposed in the art have technical construct limitations in the cleaning mechanisms used, which leads to a lower ratio of power consumed to area cleaned, directly affecting the cleaning efficiency. Thus, an Unmanned Aerial Vehicle (UAV) Propelled Autonomous Multiplane Cleaning System (UPAMCS) is disclosed. An UAV and Mopping Interface Mechanism (UAV-MIM) connects a UAV to one or more mopping systems comprising an epicyclic gear driven moppers with no additional power devices used. A maneuvering mechanism disclosed enables the UAV to propel the mopping systems to reach any geometric shape or inclination. The UPAMCS provides cost, time, and power efficient surface cleaning. The UPAMCS is also equipped with vision cameras and LiDAR for guidance during landing and crawling over surfaces along with additional surface defect detection by processing the captured images.

8 Claims, 11 Drawing Sheets

UNMANNED AERIAL VEHICLE (UAV) PROPELLED AUTONOMOUS MULTIPLANE CLEANING SYSTEM (UPAMCS)

PRIORITY CLAIM

This U.S. patent application claims priority under 35 U.S.C. § 119 to: Indian patent application Ser. No. 202321019005, filed Mar. 21, 2023. The entire contents of the aforementioned application are incorporated herein by reference.

TECHNICAL FIELD

The disclosure herein generally relates to the field of automated surface cleaning systems, and, more particularly, to Unmanned Aerial Vehicle (UAV) Propelled Autonomous Multiplane Cleaning System (UPAMCS).

BACKGROUND

Autonomous cleaning is in demand for solar panels with varying installation types including roof top solar paneling and floating solar panels spread over wide areas. Clean solar panels improve the efficiency of power generation. Similarly, developments in building and construction has led to high rise buildings, which mostly are covered with glass panes. Cleaning of these inclined glass panes is a regular task performed during building maintenance. Autonomous cleaning is one of the ideal options for cleaning of the above stated surfaces.

Use of efficient methods for the surface cleaning tasks in terms of time, cost and power consumption is critical in automation approaches. One major reason being the sites of cleaning surfaces are generally remote with challenges faced in easy access to power recharging points. Many a times the sites are at remote places. Thus, on-board battery power must be efficiently used. However, conventional autonomous surface cleaners or solar panel cleaners such as autonomous mobile robots or drones used electrically powered motors for movement of a cleaning apparatus across the surface, as well as for activating the cleaning mechanism. Thus, the existing methods are power consuming systems, affecting time and cost of cleaning. One way to assess cleaning efficiency of the surface cleaners can be in terms of ratio of power consumed to area cleaned. Further, in addition to the power consumption aspect, the construct of the cleaning mechanism is critical.

Cleaning systems proposed in the art have technical construct limitations in the cleaning mechanisms used, which lead to a lower ratio of power consumed to area cleaned, directly affecting the cleaning efficiency.

SUMMARY

Embodiments of the present disclosure present technological improvements as solutions to one or more of the above-mentioned technical problems recognized by the inventors in conventional systems. For example, in one embodiment, a system, also referred as Unmanned Aerial Vehicle (UAV) Propelled Autonomous Multiplane Cleaning System (UPAMCS), is provided.

The system comprises a UAV and Mopping Interface Mechanism (UAV-MIM) mounted on a base frame connecting to a UAV as a slung load; a driver wheel frame connected to a rear end of the base frame, a pair of driving wheels attached to a lower side of the driver wheel frame at the rear end, a worm and a worm wheel, wherein the worm wheel is attached to a driver wheel axle of the pair of driving wheels, which in turn drives the worm about a vertical axis, a driver pulley fixed at a top end of the worm, wherein one or more driven pulley belts transmit drive from the driver pulley to one or more driven pulleys connecting one or more mopping systems.

Each mopping system comprising: a set of drive arms driven by the driven pulley attached, an annular gear wheel fixed to the lower side of the base frame, a set of planet gear wheels, each planet gear wheel from the set of planet gear wheels connected to a drive arm among the set of drive arms, wherein the set of planet gear wheels are meshed between fixed internal teeth of the annular gear wheel and a sun gear wheel, while each of the drive arm rotates the set of planet gear wheels which in turn rotates the sun gear wheel and a mopping material fixed to a bottom side of the sun gear wheel and the set of planet gear wheels.

The system further comprises a cleaning fluid distribution network attached to the base frame comprising (i) an inclined surface cleaning mechanism for spraying a cleaning fluid in upward direction and (ii) a flat surface cleaning mechanism for spraying the cleaning fluid in downward direction for a surface to be cleaned below the one or more mopping systems.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1A:
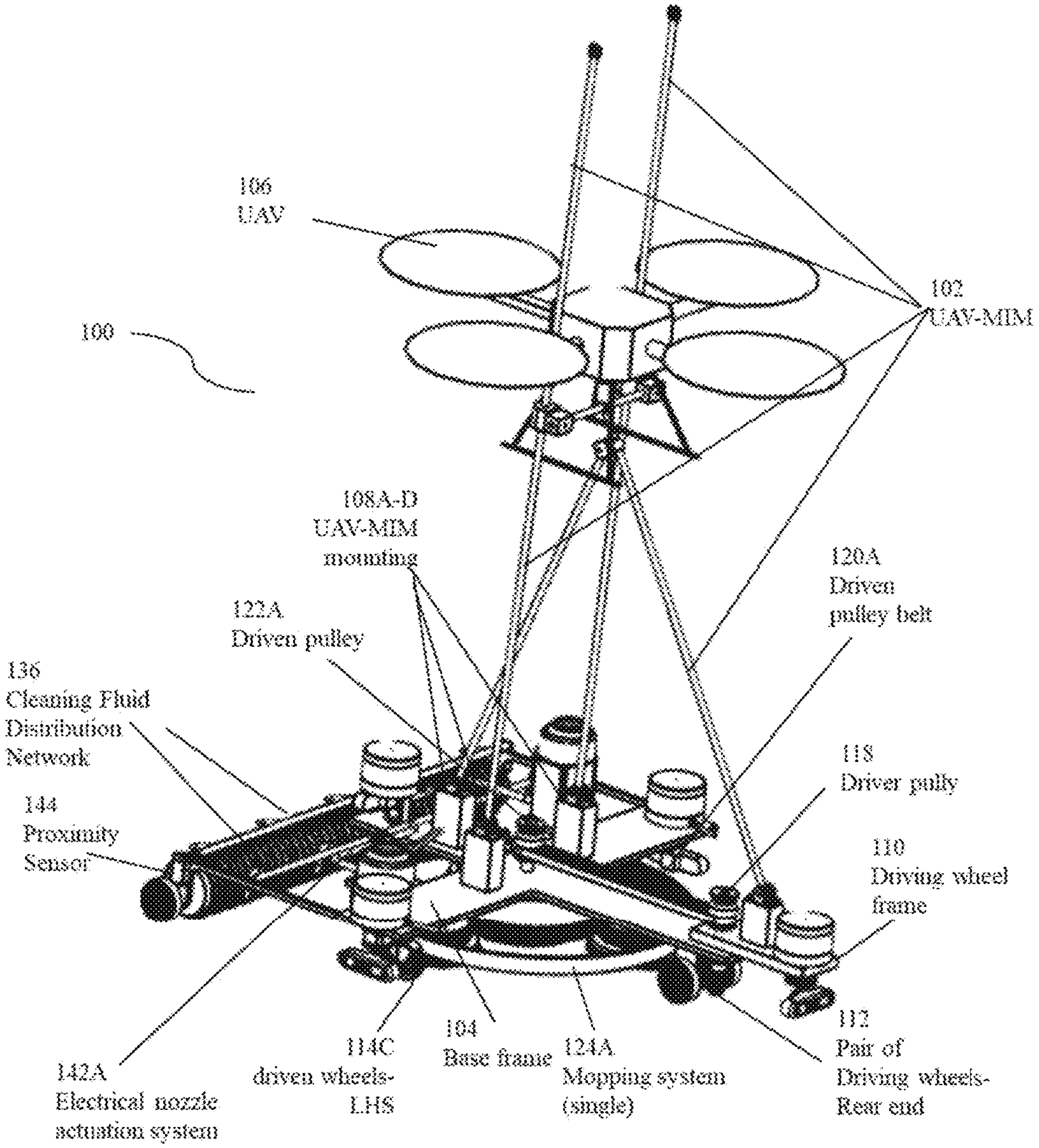
FIG. 1A is a three-dimensional (3-D) view of a system, also referred to as an Unmanned Aerial Vehicle (UAV) Propelled Autonomous Multiplane Cleaning System (UPAMCS) in a first mode of operation comprising a single mopping system depicted in a lifting configuration, according to some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Surface cleaning systems demand power, time, and cost efficient approaches. Cleaning systems proposed in the art have technical construct limitations in the cleaning mechanisms used, which leads to a lower ratio of power consumed to area cleaned, directly affecting the cleaning efficiency. Embodiments herein provide a system also referred to as an Unmanned Aerial Vehicle (UAV) Propelled Autonomous Multiplane Cleaning System (UPAMCS) for surface cleaning of flat and inclined surfaces. An UAV and Mopping Interface Mechanism (UAV-MIM) connects a UAV to one or more mopping systems comprising an epicyclic gear system, also referred to as planetary gear system, driven moppers with no additional power devices used. A maneuvering mechanism disclosed enables the UAV to propel the mopping systems to reach any geometric shape or inclination. The UPAMCS provides cost, time, and power efficient surface cleaning. The UPAMCS is also equipped with vision cameras and Light Detection and Ranging (LiDAR) for guidance during landing and crawling over surfaces along with additional surface defect detection by performing image processing on the captured images.

Referring now to the drawings, and more particularly to FIG. 1A through FIG. 6, where similar reference characters denote corresponding features consistently throughout the figures, there are shown preferred embodiments and these embodiments are described in the context of the following exemplary system and/or method. Reference numerals of one or more components of the UPAMCS as depicted in the FIGS. 1A through 5B are provided in Table 1 below for ease of description:

TABLE 1

| SI. No | Component with alternative name | Numeral reference |
|---|---|---|
| 1 | System (UAV Propelled Autonomous Multiplane Cleaning System (UPAMCS)) | 100 |
| 2 | UAV-MIM | 102 |
| 3 | Base frame (rear end, front end, Left Hand Side (LHS) and Right Hand Side (RHS) | 104 |
| 4 | UAV | 106 |
| 5 | UAV-MIM mounting | 108A-D |
| 6 | Driving wheel frame | 110 |
| 7 | Pair of Driving wheels-Rear end | 112 |
| 8 | Driven wheels (front end, LHS, RHS) | 114A-C |
| 9 | Worm | 116A |
| 10 | Worm wheel | 116B |
| 11 | Driver Pulley | 118 |
| 12 | Driven pulley belts | 120A-B |
| 13 | Driven pulleys | 122A-B |
| 14 | Mopping system | 124A-B |
| 15 | Set of Drive arms | 126A-B |
| 16 | Sun gear wheel | 128A-B |
| 17 | Annular Gear wheel | 130A-B |
| 18 | Set of planet gear wheels | 132A-B |
| 19 | Mopping material | 134 |
| 20 | Cleaning Fluid Distribution Network | 136 |
| 21 | Vision cameras | 138A-D |
| 22 | LiDARS | 140A-D |
| 23 | Electrical nozzle actuation system | 142A-B |
| 24 | Proximity sensors | 144A-B |
| 25 | Cylindrical surface cleaning rollers | 502 |
| 26 | X-type cleaning fluid tanks (elevated with head difference) | 504 |
| 27 | Y-type nozzles (in line with plane of inclined surface to be cleaned) | 506 |
| 28 | Piping network for X-type cleaning fluid tanks | 508 |
| 29 | Piping network for A-type cleaning fluid tanks | 510 |
| 30 | A-type cleaning fluid tanks (at base frame level with head difference) | 512 |
| 32 | B-type nozzles (directed downwards towards flat surface to be cleaned) | 514 |

Figure 1B:
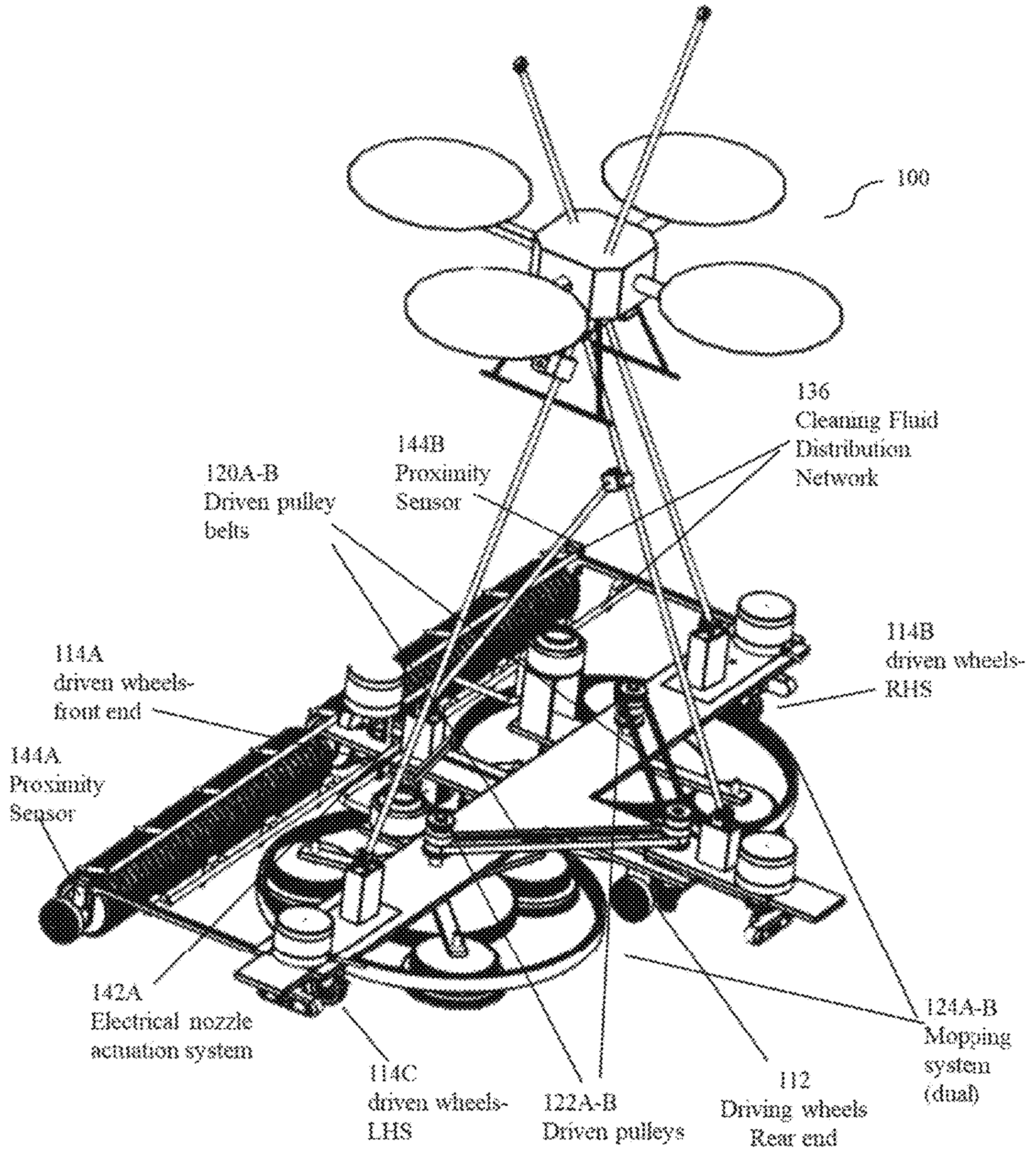
FIG. 1B is a three-dimensional (3-D) view of the system (UPAMCS), in a second mode of operation comprising a dual mopping system depicted in a lifting configuration, according to some embodiments of the present disclosure.

Irrespective of mode of operation, the mechanism for transfer of energy (forward movement) from the UAV to one or more the mopping system is the same and explained below, with specific design changes, to adapt to the two modes. FIG. 1A is a three dimensional (3-D) view of the system 100, also referred to the UPAMCS, in the first mode (UPAMCS1) of operation comprising a single mopping system depicted in a lifting configuration, according to some embodiments of the present disclosure. FIG. 1B is a three dimensional (3-D) view of the system 100 (UPAMCS), in a second mode of operation (UPAMCS2) comprising a dual mopping system depicted in a lifting configuration, according to some embodiments of the present disclosure.

Figure 3A:
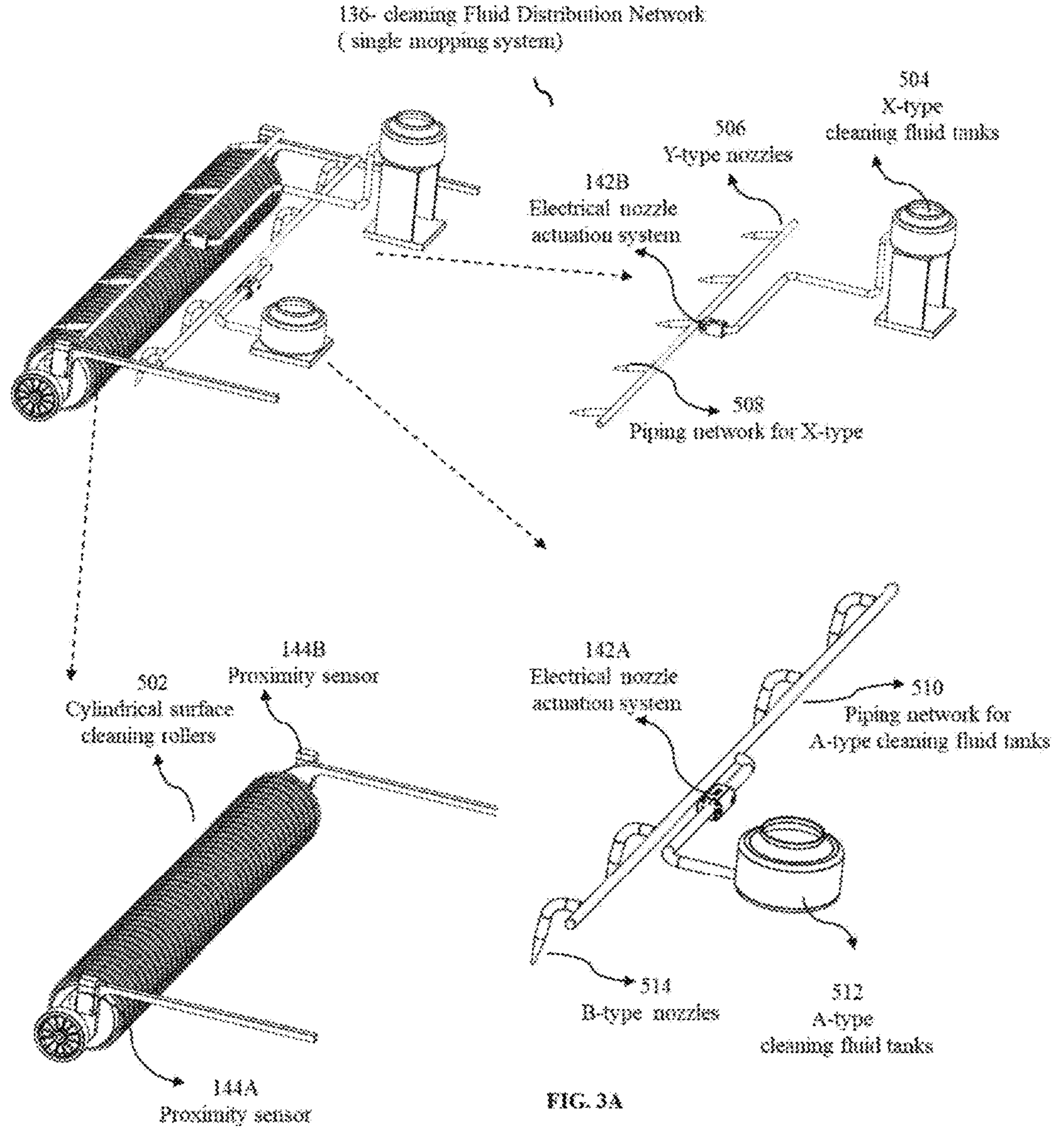
FIG. 3A depicts construction of a cleaning fluid distribution network mounted on the base frame for cleaning a flat surface and an inclined surface during a first mode of operation (UPAMCS1), according to some embodiments of the present disclosure.
Figure 3B:
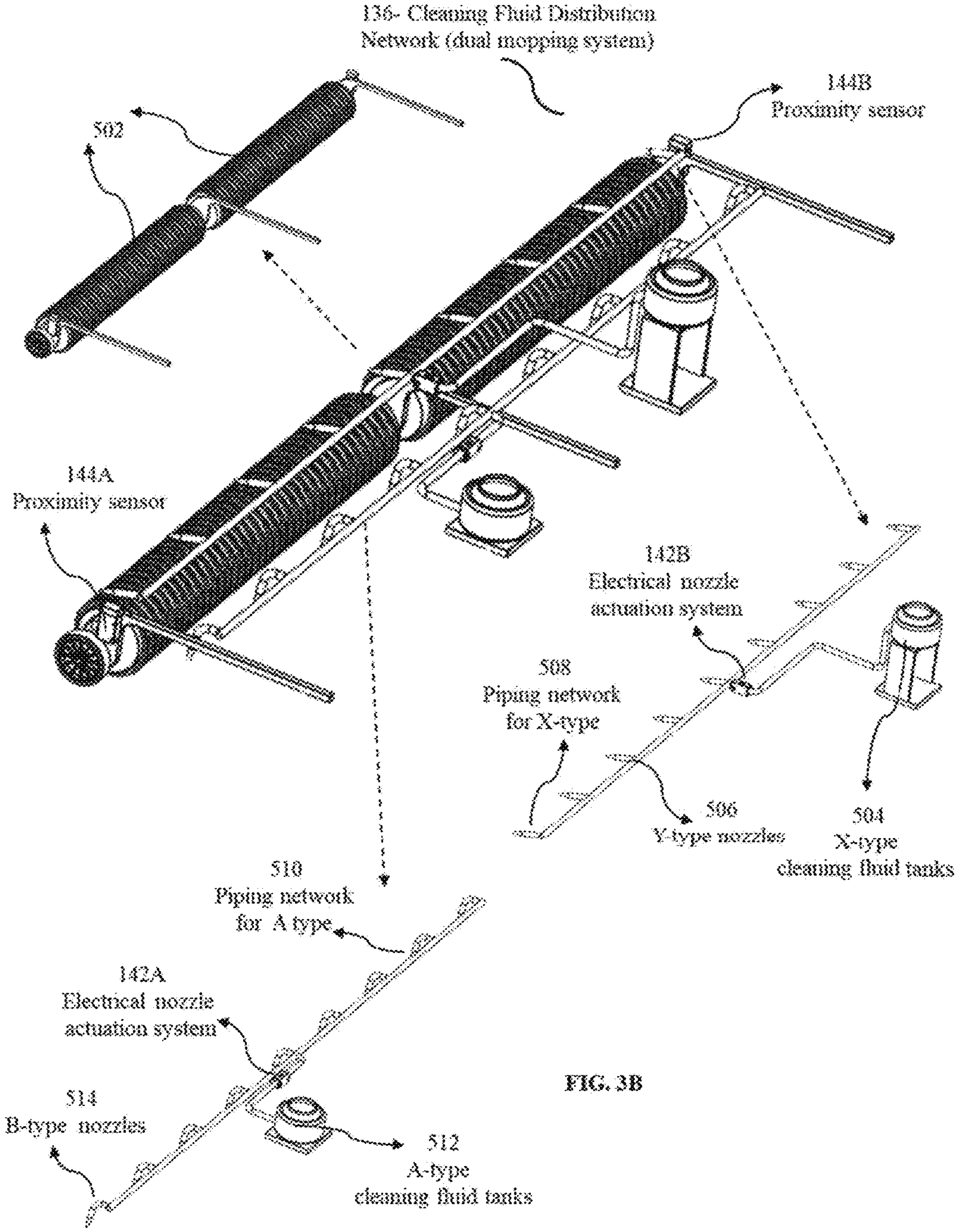
FIG. 3B depicts construction of the cleaning fluid distribution network mounted on the base frame for cleaning the flat surface and the inclined surface during a second mode of operation (UPAMCS2), according to some embodiments of the present disclosure.
Figure 4A:
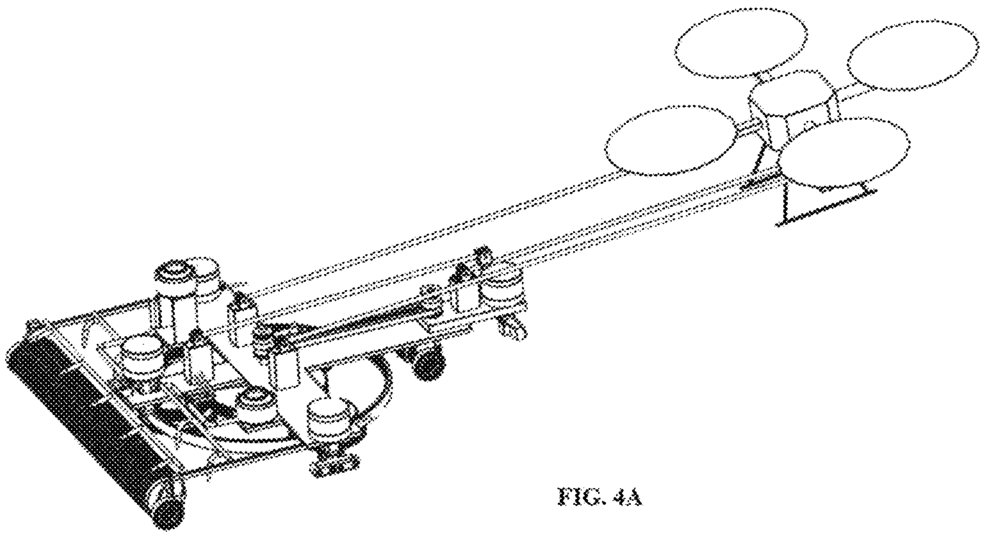
FIG. 4A depicts a normal operating configuration of the first mode (UPAMCS1) and FIG. 4B depicts a steering configuration of the first mode (UPAMCS1), according to some embodiments of the present disclosure.

As depicted in FIGS. 1A and 1B, the UAV and Mopping Interface Mechanism (UAV-MIM) 102 is mounted on the base frame 104 connecting to the UAV 106 as a slung load making the UPAMCS portable, which can be easily lifted and placed on surface to be cleaned. Thus, the UAV 106, for example a drone, functions as a primary driving system, wherein the UAV lifts the base frame 104 mounted with the mopping systems via the UAV-MIM 102 with the lifting configuration. The UAV 106 depicted in FIG. 1A through FIG. 6 figure is only for illustration. As understood by person having ordinary skill in the art, an appropriate payload UAV can be selected in accordance with the end user requirements and constraints. The UAV-MIM 102 becomes vertical with the UAV 106 powered for lift off. Once the system 100 reaches the destination (surface to be cleaned), the system 100 lands gently and operating configuration is activated as depicted in FIGS. 4A and 5A. It can be understood that lift off, landing, and setting the UAV-MIM 102 into operation mode of interest is controlled via the UAV maneuvering. Thus, once the system 100 lands, the UAV 106 automatically rotates the UAV-MIM 104 to align approximately at 5 degrees to the surface panel horizon. This mechanism enables maximum thrust of the UAV 106 to be used for driving the mopping system 124A-B. The system 100 can be steered by the steering mechanism placed at the drive wheel frame 110. The steering configuration is depicted in 4B. When the UAV 106 propels forward the pair of driving wheels 112 (at rear end of base frame 104) and the driven wheels 114A-C connected in the front end, the LHS and the RHS of the base frame 104 are moved by friction and the system 100 starts moving in either forward or backward, depending on the push direction of the drone with help of the steering mechanism.

FIGS. 2A through 2D depict structural mechanism of a plurality of components of the base frame 104 that transfer push from the UAV 106 to drive for one or more mopping systems, according to some embodiments of the present disclosure. As depicted in 3D view of FIG. 2A, the driver wheel frame 110 is connected to a rear end of the base frame 104. The pair of driving wheels 112 is attached to a lower side (or bottom side) of the driver wheel frame 110 at the rear end. The worm wheel 116B is attached to a driver wheel axle of the pair of driving wheels 112, which in turn drives the worm 116A about a vertical axis. As depicted in the 3D view of FIG. 2B, the driver pulley 118 fixed at a top end of the worm 116A, wherein one or more driven pulley belts 120A-B transmit drive from the driver pulley 118 to one or more driven pulleys 122A-B further connected to one or more mopping systems 124A-B.

Thus, the system 100 provides two embodiments, the single mopping system and dual mopping system. The choice of mode to be used is dependent on area of the surface of interest. For example, for a smaller area the single mopping system is a preferred choice at it reduces the payload of the UAV 106 to half and hence the cost.

Figure 2A:
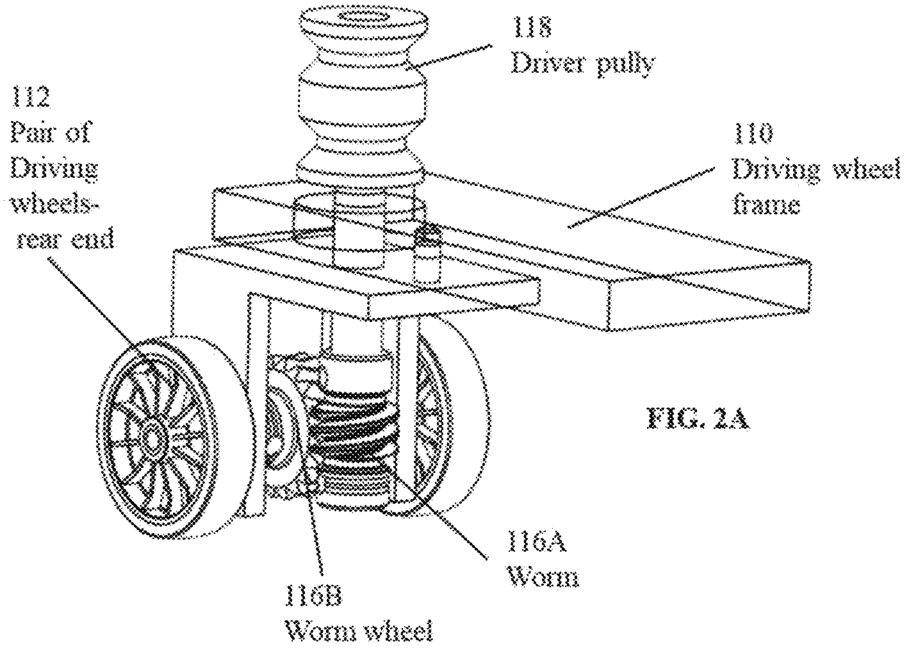
FIGS. 2A through 2D depict a structural mechanism of a plurality of components of a base frame of the UPAMCS that transfer forward push from a UAV to drive one or more mopping systems, according to some embodiments of the present disclosure.
Figure 2B:
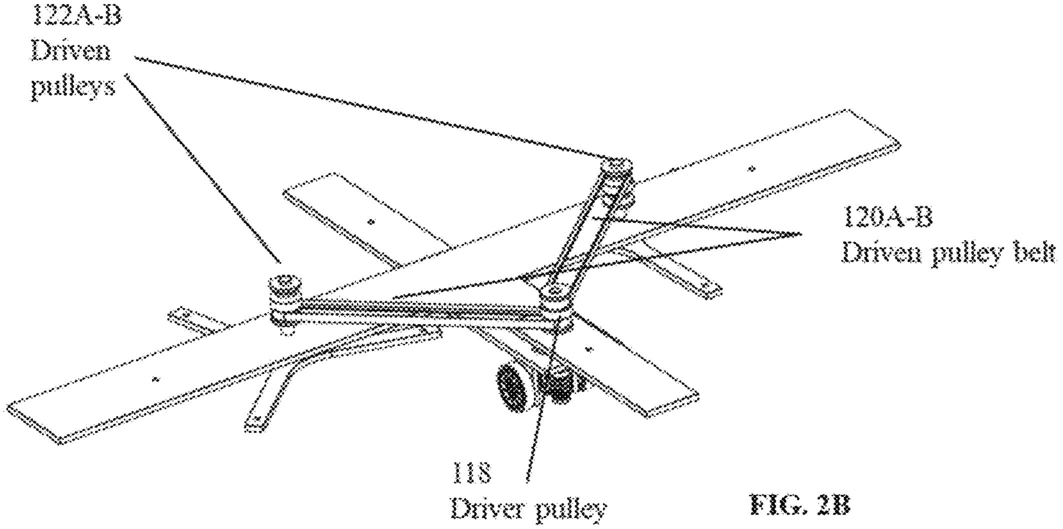
Figure 2C:
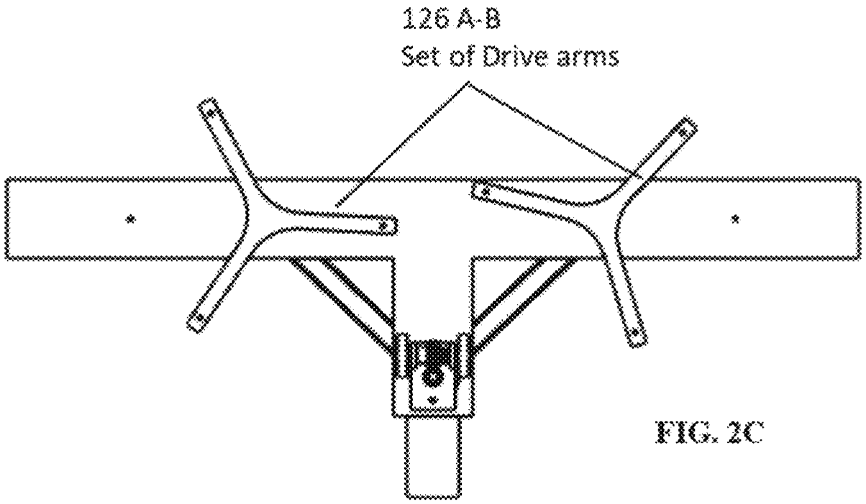
Figure 2D:
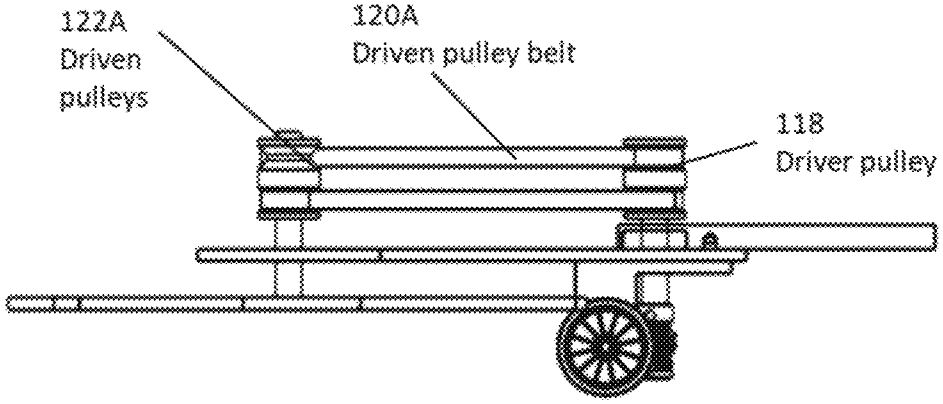
Figure 2E:
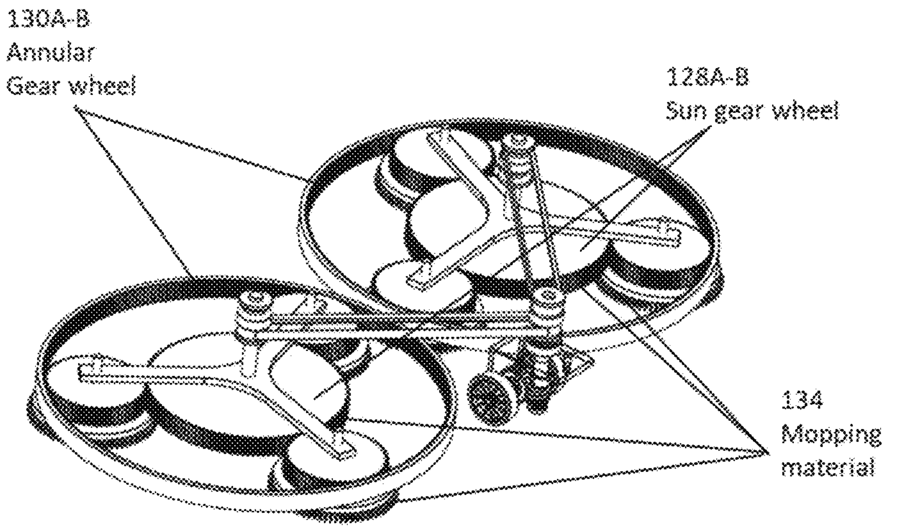
FIGS. 2E through 2G depict a mechanism of the mopping system connected to a base frame of the UPAMCS, according to some embodiments of the present disclosure.
Figure 2F:
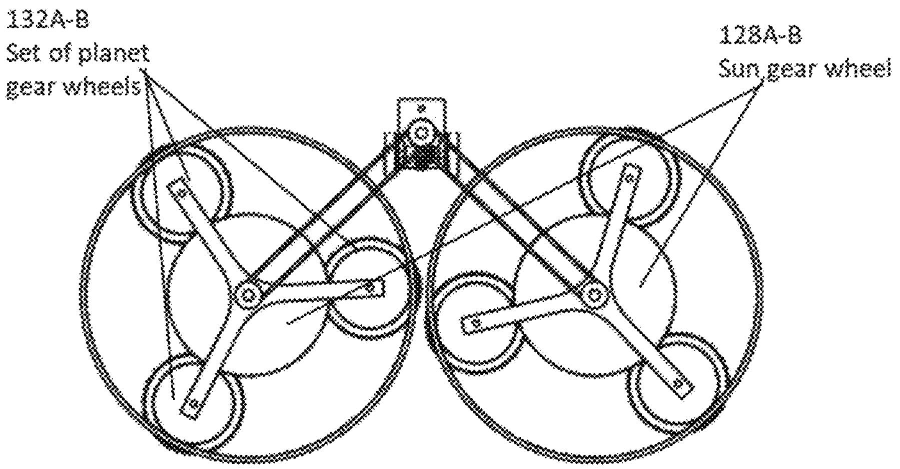
Figure 2G:
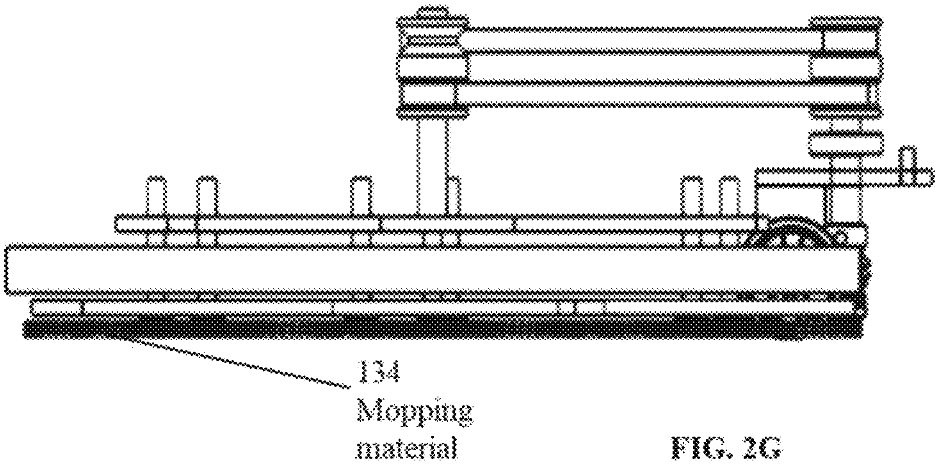

FIGS. 2E through 2G depict the mechanism of the mopping system 124 connected to the base frame 104 of the UPAMCS100, according to some embodiments of the present disclosure. Each mopping system 124A-B has similar (or identical) mechanism for cleaning. As depicted in the 3D view of FIG. 2E, top view of in FIG. 2F and sideview of FIG. 2G, the mopping system 124 includes the set of drive arms 126A driven by the driven pulley 120A attached further driving an epicyclic or planetary gear system. The planetary gear system comprises an annular gear wheel 130A fixed to the lower side of the base frame 104, a set of planet gear wheels 132A each connected to the drive arm among the set of drive arms 126A. The set of planet gear wheels 132A are meshed between fixed internal teeth of the annular gear wheel 130A and the sun gear wheel 128A, while each of the drive arm rotates the set of planet gear wheels 132A which in turn rotates the sun gear wheel 128A and a mopping material 134 fixed to a bottom side of the sun gear wheel 128A and the set of planet gear wheels 132A.

The UPAMCS100 is equipped with the cleaning fluid distribution network 136 attached to the base frame 104, which can operate differently for to address requirements of cleaning fluid spaying for an inclined surface and a flat surface. Examples of inclined surfaces include vertically mounted (90 degrees) glass panes or angularly mounted glass panes. The UAV 106 with UAV-MIM 102 can easily maneuver the moping systems at any angle with irregular shape surface. Examples of flat surfaces include floating or roof top solar panels and the like. The cleaning fluid distribution network 136 comprises (i) an inclined surface cleaning mechanism for spraying the cleaning fluid in an upward direction, and (ii) a flat surface cleaning mechanism for spraying the cleaning fluid in a downward direction for a surface to be cleaned below the one or more mopping systems 124A-B. FIG. 3A depicts 3-D view of construction of the cleaning fluid distribution network 136 mounted on the base frame 104 for cleaning a flat surface and an inclined surface during the first mode of operation (UPAMCS1), according to some embodiments of the present disclosure. FIG. 3B depicts construction of the cleaning fluid distribution network 136 mounted on the base frame for cleaning the flat surface and the inclined surface during the second mode of operation (UPAMCS2), according to some embodiments of the present disclosure.

As depicted in the 3-D view of FIGS. 3A and 3B, the inclined surface cleaning mechanism comprises the plurality of X-type cleaning fluid tanks 504 (elevated with head difference) and a plurality of Y-type nozzles 506 (in line with plane of inclined surface to be cleaned), which are electrically activated using the electrical nozzle actuation system 142A-B on receiving signals from the proximity sensors 144A-B and the vision cameras 138A-D. Once the Y-type nozzles 506 that are placed parallel to the inclined plane of the surface to be cleaned are activated, the cleaning fluid is sprayed via the piping network 508 to clean the inclined surface using one or more cylindrical surface cleaning rollers 502. The cylindrical surface cleaning rollers 502 is a single unit in FIG. 3A for single mopping system UPAMCS1, while the FIG. 3B depicts a split design for dual mopping system aligned in front of each mopping system 132A-B.

As depicted in FIGS. 3A and 3B, the flat surface cleaning mechanism comprises a plurality of A-type cleaning fluid tanks 512 (at base frame level with head difference) and a plurality of B-type nozzles 514 (directed downwards towards flat surface to be cleaned), which are electrically activated using the electrical nozzle actuation system 142A-B on receiving signals from the proximity sensors 144A-B and the vision cameras 138A-D. Once the B-type nozzles (514) that face towards the mopping system facing the surface to be cleaned are activated, the cleaning fluid is sprayed via the piping network 510 to clean the flat surface using one or more cylindrical surface cleaning rollers 502 and the one or more mopping systems 124A-B. The flow of the cleaning fluid is ensured by placing the cleaning fluid tanks to allow gravity flow.

UPAMCS operation: The UAV 106 is equipped with landing and take-off configurations, wherein the UAV-MIM 102 allows the UAV 106 to land and take-off vertically. A drive configuration of the UPAMCS100 activated after landing on the surface enables utilizing a propulsive power of the UAV 106 to maximum for pushing the pair of driving wheel 112 and the driven wheels 114A-C using friction, wherein the pair of driving wheels 112 at the rear end of the base frame 104, and the driven wheels 114A-C attached to each of a front end, a Left Hand Side (LHS) and a Right Hand Side (RHS) of the base frame 104 push the UPAMCS100 forward over the surface to be cleaned. The cleaning fluid distribution network 136 is activated as soon as the UPAMCS100 lands and drives forward, spraying the cleaning fluid on the surface enabling the mopping system 124A-B to cleanse. One or more cylindrical surface cleaning rollers 502 installed in the front of the base frame 104 and supported at (i) the LHS, a middle side and the RHS of the UPAMCS base frame 104 for a two cylindrical surface cleaning rollers configuration, and (ii) at the LHS and the RHS for a single cylindrical surface cleaning roller configuration. The brushes are free to rotate about central axles. The electrical nozzle activation system 142A-B and the proximity sensor 144A-B can be controlled via on-board processing by the UAV 106 in accordance with the current UPAMCS configuration.

Figure 2H:
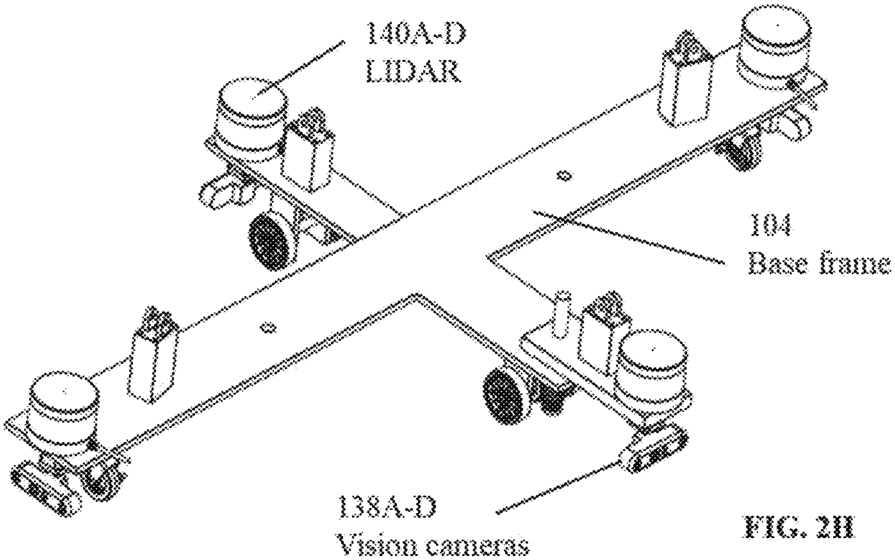
FIG. 2H illustrates vision cameras and Light Detection and Ranging (LIDARS) mounted on the base frame for tracking and monitoring landing and movement over surfaces, according to some embodiments of the present disclosure.

FIG. 2H illustrates a visual based navigation system enabled by LIDARS 140A-D and one or more vision cameras 138A-D, each placed each end of the of the base frame 104. The visual information and LiDAR points captured by a visual based navigation system can be processed on-board by the UAV 106 enabling automatically and dynamically monitoring and tracking of the action of UPAMCS100 over the surface to be cleaned. This also enables inspection of the surface. The processed information can be communicated to a central processing unit by the UAV 106 for further action to be initiated such as triggering damage alert, notifying cleaning task initiation or completion and so on to a remote administrator In an embodiment, additional tactile or pressure sensors may be implemented for controlling the impact of the system (100) while landing, moving or in contact with surface to be cleaned, specifically for impact sensitive surfaces such as solar panels. In an embodiment the system may be equipped with a single LiDAR and placed at any one of the front end, rear end, LHS and RHS of the base frame 104, such that the single LiDAR provides the necessary views for navigation and control.

Figure 4B:
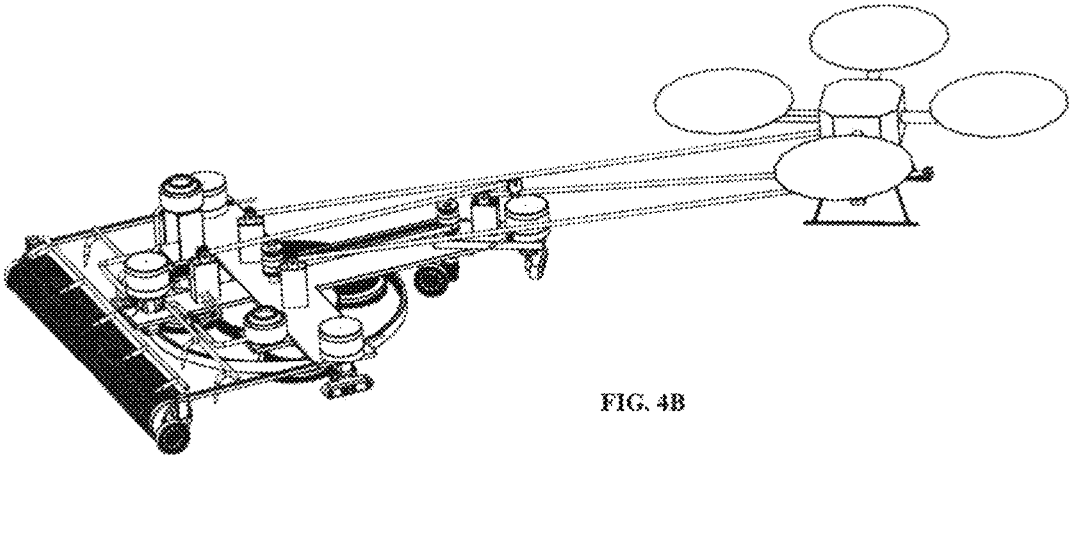
Figure 5A:
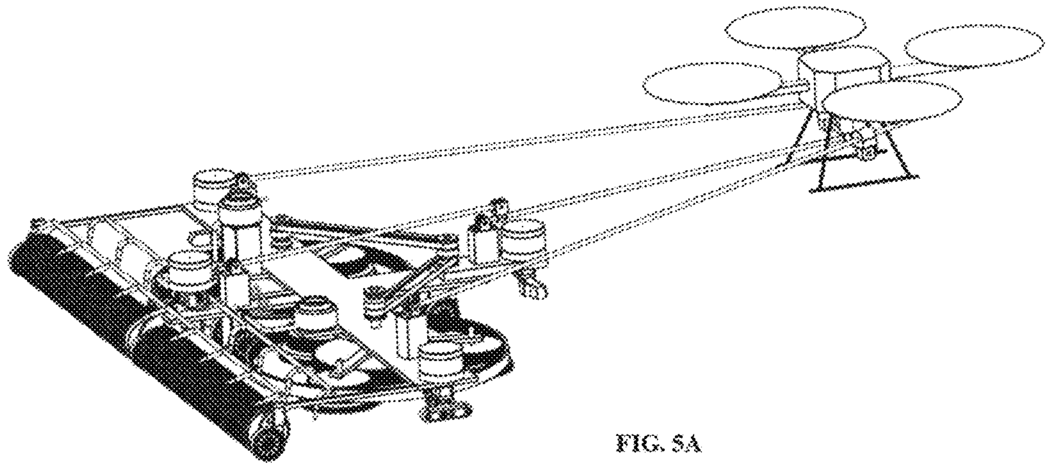
FIG. 5A depicts the normal operating configuration of the second mode (UPAMCS2) and FIG. 5B depicts the steering configuration of the second mode (UPAMCS2), according to some embodiments of the present disclosure.
Figure 5B:
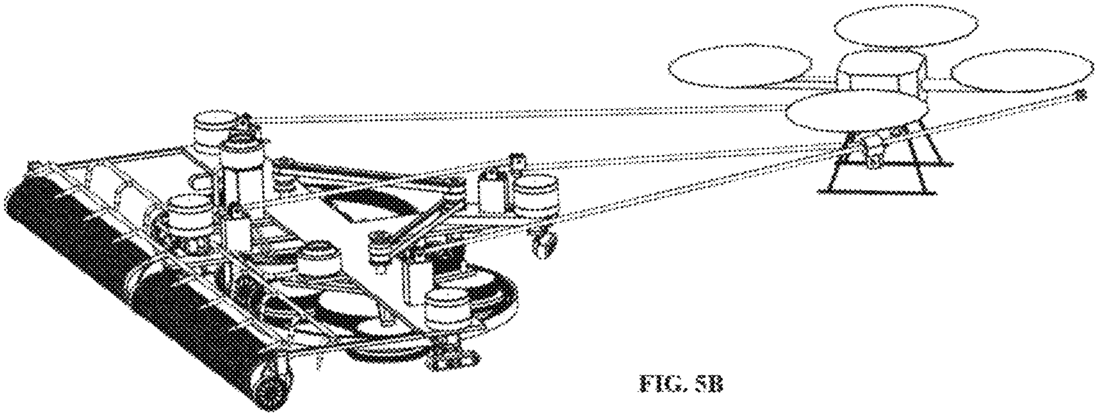

The mopping system 124 works under three configurations comprising:

a) The lifting configuration (as depicted in FIGS. 1A and 1B), wherein the UAV-MIM mounting 108A-D is at 90 degree with UPAMCS base frame 104 making it feasible for the mopping system 124A-B to be lifted during positioning (landing) and take-off.
b) A normal operating configuration (as depicted in FIGS. 4A and 5A), wherein the pair of driving wheels 112 and the driven wheels 114A-C are moved by friction as a push from the UAV (106) when the UAV (106) propels in a specific direction.
c) A steering configuration (as depicted in FIGS. 4B and 5B), wherein rotation of the pair of driving wheels 112 in turn starts rotating the worm 116A and the worm wheel 116B mechanism which has a drive shaft attached over, the drive shaft in turn rotates the driver pulley 118, wherein the rotation is transmitted to the driven pulley 122A-B through the driven pulley belts 120A-B. The driven pulley 122A-B transmits the rotation to drive arms 126A-B that is passed through the UPAMCS base frame 104. The drive arms 126A-B transmit the rotation to the set of planet gear wheels 132A-B attached to the drive arms 126A-B, wherein the set of planet gear wheels 132A-B are meshed to the inner teeth of the annular gear wheel 130A-B and the sun gear wheel 128A-B for movement of the mopping material 134 for cleaning the surface.

Figure 6:
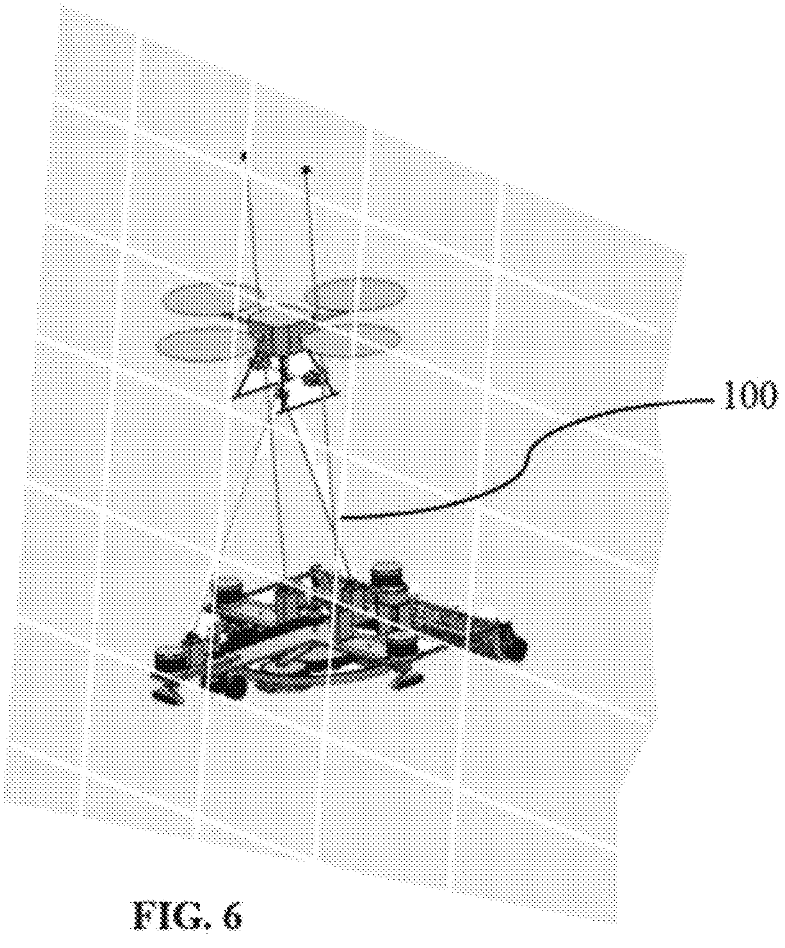
FIG. 6 is a schematic depicting inclined surface cleaning mechanism by maintaining the UAV in the lifting configuration, wherein the system moves up and down with cylindrical surface cleaning rollers pressing against the inclined surface, according to some embodiments of the present disclosure.

FIG. 6 is a schematic depicting inclined surface cleaning mechanism by maintaining with the UAV in the lift configuration, wherein the system 100 moves up and down with the cylindrical surface cleaning rollers 502 pressing against the inclined surface such as a windowpane.

Provided below is an illustrative 'cleaning time' calculation of the system 100.

Nomenclature and specification of an example system 100 considered is as below:

Driving wheel=dw: Dia=Ddw=78.5 mm
Worm gear=wg; No of teeth Twg=20
Worm=w; No. of starts of thread Nst=2
Driven pulley=dp; Driven pulley speed=Ndp
Epicyclic arm=a; Arm speed=Na
Planet gear=p; No of teeth=Tp=75; module=2
Sun gear=s; No of teeth=Ts=150; module=2
Design calculation for Solar Pond (SP) cleaning:

a) System speed=Vdw=3.6 m/s (Drone is assumed to provide)
b) Driving wheel speed=Ndw=Vdw/(Ddw/2*2*Π/60) =876 rpm
c) Worm gear speed=Nwg=Ndw=876 rpm
d) Worm speed=Nw=(Twg/Nst)*Nwg=87.6 rpm=88 rpm
e) Planet gear speed=Np=Na=Ndp=Nw=88 rpm
f) Sun gear speed=Ns=Np*Tp/Ts=44 rpm
g) Cleaning time for SP:
   i. SP diameter=Dsp=50 m
   ii. SP surface area=Asp=Π/4*Dsp^2=Π/4*50*50 m^2
   iii. Mopping wheel (MW) dia=Dmw=0.6 m
   iv. MW area=Amw=Π/4*Dmw^2=Π/4*0.6*0.6 m^2
   v. Mopping system area=Ams=2*Amw=2*Π/4*0.6*0.6 m^2
   vi. No. of Dmw moved in 1 sec=Vdw/Dmw=3.6/0.6=6
   vii. Area cleaned per sec=6*Ams=6*2*Π/4*0.6*0.6 m^2
   viii. SP cleaning time=Asp/(6*Ams)=578.7 s=9 min 37 s
h) As per the above calculation the system 100 can clean the 50 m diameter solar plant in 9 min 37 s.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method controlling the UAV configuration, when the program runs on a server or a device, for example, the embedded compiler or any edge device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. An Unmanned Aerial Vehicle (UAV) Propelled Autonomous Multiplane Cleaning System (UPAMCS), comprising:

a UAV and Mopping Interface Mechanism (UAV-MIM);

a base frame;

a UAV;

wherein the UAV-MIM is mounted on the base frame, thereby connecting the UAV with the base frame as a slung load;

a driver wheel frame connected to a rear end of the base frame;

a pair of driving wheels attached to a lower side of the driver wheel frame at the rear end, a worm and a worm wheel, wherein the worm wheel is attached to a driver wheel axle of the pair of driving wheels, which in turn drives the worm about a vertical axis;

a driver pulley fixed at a top end of the worm, wherein one or more driven pulley belts transmit drive from the driver pulley to one or more driven pulleys connecting one or more mopping systems, each mopping system comprising:

a set of drive arms driven by the driven pulley attached;

an annular gear wheel fixed to the lower side of the base frame; and a set of planet gear wheels, each planet gear wheel from the set of planet gear wheels is connected to a drive arm among the set of drive arms, wherein the set of planet gear wheels is meshed between fixed internal teeth of the annular gear wheel and a sun gear wheel, wherein each of the drive arm rotates the set of planet gear wheels which in turn rotate the sun gear wheel and a mopping material fixed to a bottom side of the sun gear wheel and the set of planet gear wheels; and a cleaning fluid distribution network attached to the base frame comprising (i) an inclined surface cleaning mechanism for spraying cleaning fluid in an upward direction and (ii) a flat surface cleaning mechanism for spraying the cleaning fluid in a downward direction for a surface to be cleaned below the one or more mopping systems.

2. The UPAMCS of claim 1, wherein the inclined surface cleaning mechanism comprises a plurality of X-type cleaning fluid tanks and a plurality of Y-type nozzles, which are electrically actuated via an electrical nozzle actuation system mounted on the base frame for spraying the cleaning fluid to clean an inclined surface using one or more cylindrical surface cleaning rollers, wherein the one or more cylindrical surface cleaning rollers installed in the front of the base frame.

3. The UPAMCS of claim 1, wherein the flat surface cleaning mechanism comprises a plurality of A-type cleaning fluid tanks and a plurality of B-type nozzles, which are electrically activated via the electrical nozzle mounted on the base frame system for spraying the cleaning fluid to clean a flat surface using one or more cylindrical surface cleaning rollers and the one or more mopping systems, wherein the one or more cylindrical surface cleaning rollers installed in the front of the base frame.

4. The UPAMCS of claim 1, wherein the UAV is equipped with landing and take-off configurations, and wherein the UAV-MIM allows the UAV to land and take-off vertically.

5. The UPAMCS of claim 4, wherein the UPAMCS operates in a first mode (UPAMCS1) with a single mopping system or a second mode (UPAMCS2) with a dual mopping system.

6. The UPAMCS of claim 4, wherein a drive configuration of the UPAMCS activated after landing on the surface enables utilizing a propulsive power of the UAV to maximum for the pair of driving wheel and driven wheels using friction, wherein the pair of driving wheels at the rear end of the base frame, and driven wheels attached to each of a front end, a Left Hand Side (LHS) and a Right Hand Side (RHS) of the base frame push the UPAMCS forward over the surface to be cleaned, the cleaning fluid distribution network is activated when the UPAMCS lands and drives forward, spraying the cleaning fluid on the surface enabling the mopping system to cleanse, and one or more cylindrical surface cleaning rollers installed in the front of the base frame and supported at (i) the LHS, a middle side and the RHS of the base frame for a two cylindrical surface cleaning rollers configuration, and (ii) at the LHS and the RHS for a single cylindrical surface cleaning roller configuration, wherein the brushes are configured to freely rotate about central axles.

7. The UPAMCS of claim 1, comprises a visual based navigation system enabled by one or more LiDARS, and one or more vision cameras placed at the front end, the rear end, the LHS and the RHS of the base frame.

8. The UPAMCS of claim 1, wherein the mopping system is operated with a plurality of configurations comprising:

a lifting configuration, wherein a UAV-MIM mounting is at 90 degree with the base frame enabling the mopping system to be lifted during landing and take-off;

a normal operating configuration, wherein in the normal operating configuration the pair of driving wheels and the driven wheels are moved by friction as a push from the UAV when the UAV propels in a specific direction;

a steering configuration, wherein in the steering configuration rotation of the pair of driving wheels in turn starts rotating the worm and the worm wheel which has a drive shaft attached over, the drive shaft in turn rotates the driver pulley, and wherein the rotation is transmitted to the driven pulley through the one or more driven pulley belts;

the driven pulley transmits the rotation to the set of drive arms that is passed through the base frame, wherein the set of drive arms transmit the rotation to the set of planet gear wheels attached to the set of drive arms, wherein the set of planet gear wheels is meshed to the inner teeth of the annular gear wheel and the sun gear wheel for movement of the mopping material for cleaning the surface.

* * * * *